Nov. 3, 1931.  F. G. G. ARMSTRONG  1,830,418
SHOCK ABSORBER FOR VEHICLES
Filed Aug. 30, 1928   2 Sheets-Sheet 1.
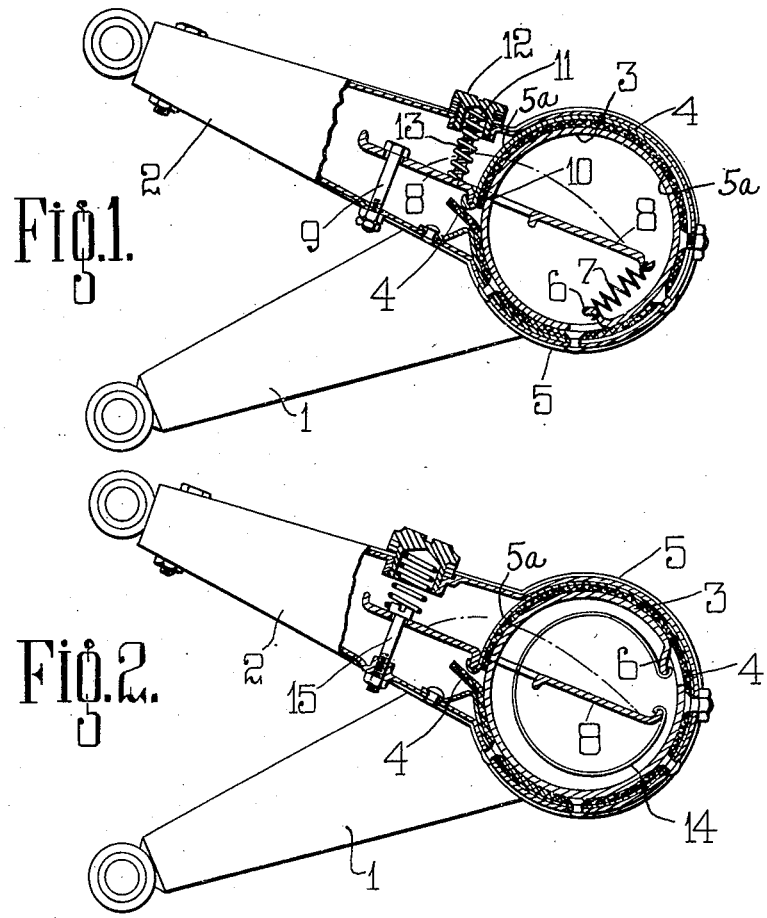
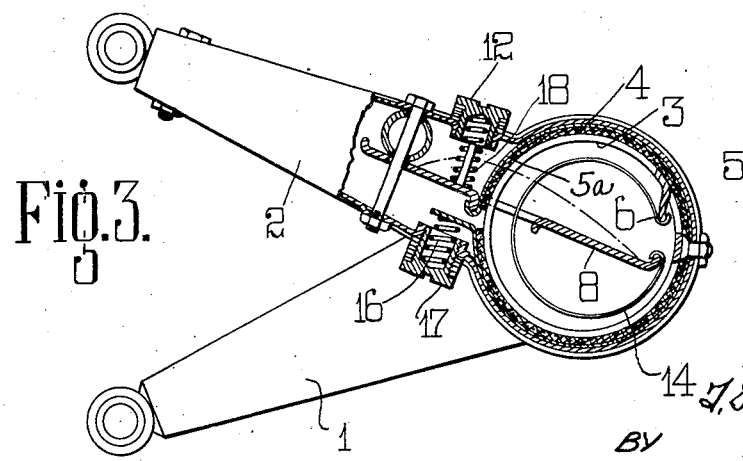
INVENTOR
F. G. G. Armstrong
BY
Andrews & Mason
ATTORNEYS Nov. 3, 1931.  F. G. G. ARMSTRONG  1,830,418
SHOCK ABSORBER FOR VEHICLES
Filed Aug. 30, 1928  2 Sheets-Sheet 2
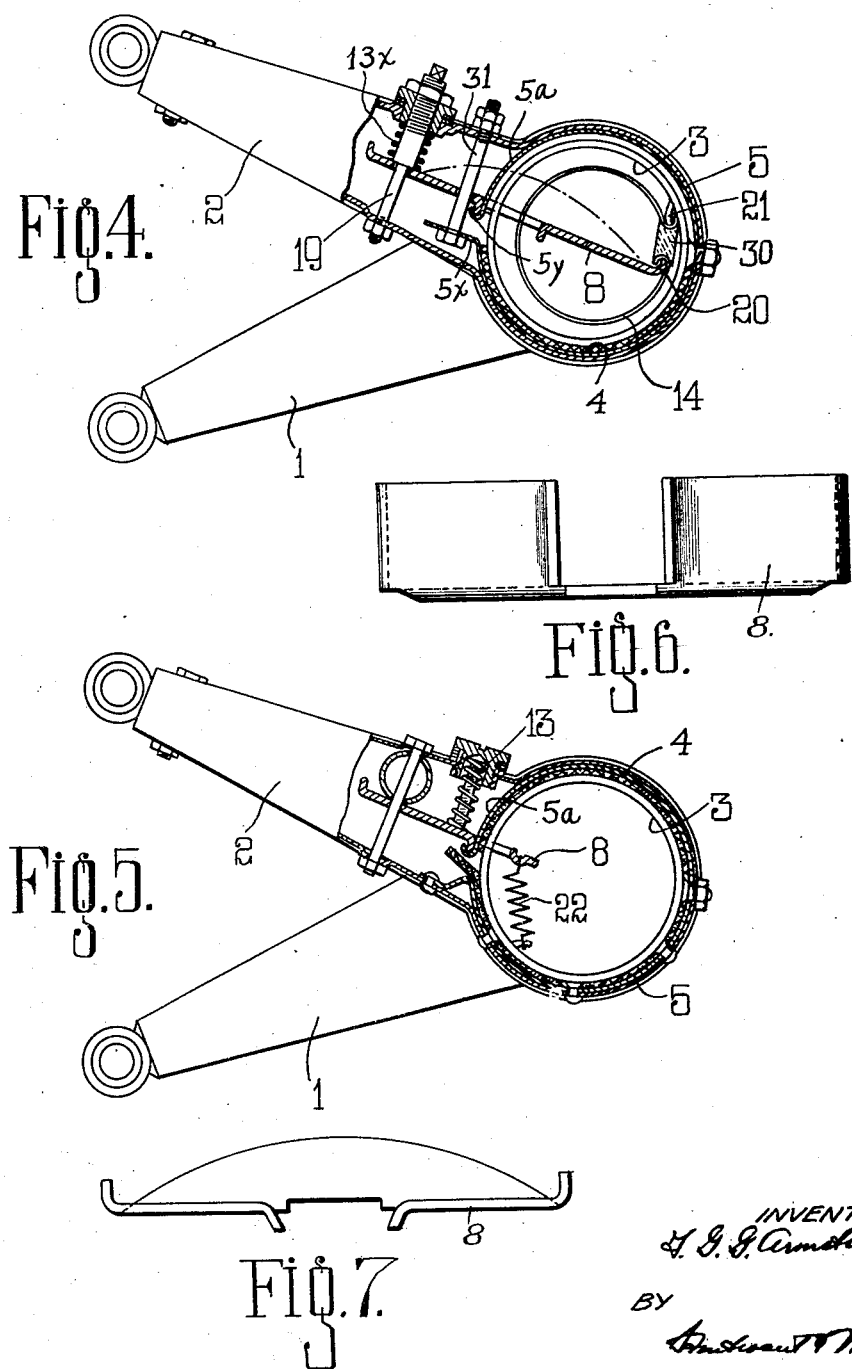

Patented Nov. 3, 1931

1,830,418

UNITED STATES PATENT OFFICE

FULLERTON GEORGE GORDON ARMSTRONG, OF BEVERLEY, ENGLAND

SHOCK ABSORBER FOR VEHICLES

Application filed August 30, 1928, Serial No. 303,096, and in Great Britain September 1, 1927.

The present invention relates to improvements in shock absorbers for vehicles, and is particularly suitable for application to damping the movement of the spring supported axles of automobile vehicles.

According to the present invention the damping effect exerted by a shock absorber is adapted to be increased towards one end of the range of movement of the parts the relative oscillation of which is to be damped. In the case of a friction shock absorber the pressure applied to the friction lining is increased according to the displacement of the movable part, preferably by means of a cam or cams, but in certain cases this may be effected by means of a spring or springs.

The invention is more particularly described with reference to the accompanying drawings in which:—

Figure 1 is an elevation of a shock absorber partly in section.

Figures 2, 3, 4 and 5 are similar views of modified forms of the invention.

Figures 6 and 7 illustrate a detail.

The two arms 1, 2 of the shock absorber are adapted to be attached in known manner, to the axle of a vehicle and to the frame respectively the relative oscillation of which parts it is desired to damp.

The arm 1 has secured to it a cylindrical drum part 3 adapted to turn within a friction lining 4 riveted or otherwise secured within an outer drum 5 secured to the arm 2 of the shock absorber. A metal strip 5a is illustrated as surrounding the lining and serving as a means of transmitting power to the free end thereof.

To a lug 6 on the drum part 3 is attached one end of a spring 7 the other end of which is secured to the end of a lever 8 fulcrumed about a pin 9 on the arm 2.

It will consequently be seen that as the angularity of the arms 1, 2 decreases so is the free end 10 of the friction lining 4 secured to the lever 8, brought with increasing pressure upon the surface of the drum part 3.

Means such as compression spring 11, adjustable by the threaded bush 12, may be provided to adjust the initial contractional pressure of the lining 4 on the drum part 3.

A pin 13 on the lever 8 forms a support and guide for the spring 11.

In the modified form of construction shown in Figure 2 a watch-spring type of spring 14 is shown substituted for the helical spring 7. Further a modification of construction is shown in which the spring for adjusting the initial friction loading is applied at the fulcrum pin 15 of the lever 8.

In the further modification illustrated in Figure 3 the friction lining 4 is held at its middle only to the drum 5, and at one end is attached to the lever 8 whilst at the other end it is attached to a second spring loading means 16 adjustable by means of the head 17. This loading means may be additional to or alternative to the adjustable loading 18, or again this spring loading means may act on a second pivoted lever similar to the lever 8 which has an end engaging the free end of the lining 4.

As shown with reference to Figure 4 means such as a threaded bolt 19 can be provided to adjust the tension of the spring 14. Further a spring or rubber pad 30 can be inserted between the lugs 20, 21 on lever and drum respectively to apply pressure to the lining through the lever 8 and may be used with or without the clock type spring. The coil spring 13x around the end of the bolt 19 acts between the box-like arm 2 and the lever 8 to establish a normal tension on the rebent end 5y of the metal strip 5a. A bolt 31 engaged with the box-like arm 2 passes through the other end 5x of the metal strip, which is bent outwardly to receive the head of the bolt.

In certain cases it may be desirable to increase the frictional load between the arms 1, 2, as their angularity increases. Such an arrangement is shown by way of example in Figure 5 in which the position of the spring connection 22 is reversed as compared with Figures 1 to 4.

Again the features of Figure 1 and Figure 4 may be combined so that the frictional loading increases progressively on increase or decrease of angularity of the arms 1, 2, from a median position.

The arm 2 is conveniently made hollow or box like to enclose the parts.

The invention has been more particularly described with reference to a shock absorber of the type in which the friction part is in the form of a lining bearing on a cylindrical surface, the improvements are however equally applicable to that type of shock absorber in which the friction elements are in the form of washers clamped between the arms about their pivotal point.

In a modified form of construction the friction parts may be shaped so as to present a greater area of contact in certain angular positions of the parts of the shock absorber; that is to say, in the case of friction washers one washer may have an increased thickness providing a cam surface, or again where these are of tubular form, one friction part may be slightly oval.

I declare that what I claim is:

1. A shock absorber for damping relative oscillation between two elements comprising a pair of arms pivoted at their inner ends and adapted to be connected at their outer ends respectively to said elements, a cylindrical drum on one arm, a friction lining secured to the other arm and engaging with said drum, a lever located partly within the drum and fulcrumed at one end on the arm carrying the friction lining and attached to one free end of said lining, adjustable spring loading means for operating upon the other free end of said lining, variable loading means and governed by the angularity of the arms for operating upon said lever at its end within the drum and adjustable spring loading means for operating upon said lever without the drum.

2. A shock absorber for damping relative oscillation between two elements comprising a flat arm and a box-shaped arm, a cylindrical portion at the inner end of said box-shaped arm, a cylindrical drum on the inner end of said flat arm lying concentrically within said cylindrical portion, a friction lining and a metal strip encircling said lining between the drum and the cylindrical portion and secured to said cylindrical portion, a turned up portion at one end of said strip, a bolt passing through the box-shaped member, a lever fulcrumed at one end about said bolt, an adjustable compression spring abutting said lever and the box-shaped arm, a lug on the cylindrical drum, and a spring attached at one end to said lug and at the other end to the end of the lever within said drum so that the spring exerts a force on the lever in the same direction as that of the compression spring and a lug on the lever at a point intermediate of said springs engaging with the turned up portion at the end of said strip so as to exert a force on the lever in counter-direction to that due to said springs.

3. A shock absorber for damping relative oscillation between two elements comprising a flat arm and a box-shaped arm, a cylindrical portion at the inner end of said box-shaped arm, a cylindrical drum on the inner end of said flat arm lying concentrically within said cylindrical portion, a friction lining and a metal strip encircling said lining, between the drum and the cylindrical portion and secured to said cylindrical portion, a turned up portion at one end of said strip, an adjustable compression spring abutting the box-shaped arm and a bent out portion at the other end of said strip, a bolt passing through the box-shaped member, a lever fulcrumed at one end about said bolt, an adjustable compression spring abutting said lever and the box-shaped arm, a lug on the cylindrical drum and a spring attached at one end to said lug and at the other end to the end of the lever within said drum, so that the spring exerts a force on the lever in the same direction as that of the compression spring, and a lug on the lever at a point intermediate of said springs engaging with the turned up portion at the end of said strip so as to exert a force on the lever in counter-direction to that due to said springs.

4. A shock absorber for damping relative oscillation between two elements comprising a flat arm and a box-shaped arm, a cylindrical portion at the inner end of said box-shaped arm, a cylindrical drum on the inner end of said flat arm lying concentrically within said cylindrical portion, a friction lining and a metal strip encircling said lining between the drum and the cylindrical portion and secured to said cylindrical portion, a turned up portion at one end of said strip, a bolt passing through the box-shaped member, a lever fulcrumed at one end about said bolt, an adjustable compression spring abutting said lever and the box-shaped arm, a lug on the cylindrical drum and a spring attached at one end to said lug and at the other end to the end of the lever within said drum so that the spring exerts a force on the lever in the same direction as that of compression spring, a rubber pad interposed between the lug on the drum and the end of the lever within the drum and a lug on the lever at a point intermediate of said springs engaging with the turned up portion at the end of said strip so as to exert a force on the lever in counter-direction to that due to said springs.

5. A shock absorber for damping relative oscillation between two elements comprising a flat arm and a box-shaped arm, a cylindrical portion at the inner end of said box-shaped arm, a cylindrical drum on the inner end of said flat arm lying concentrically within said cylindrical portion, a friction lining and a metal strip encircling said lining between the drum and the cylndrical portions and secured to said cylindrical portion, a turned up portion at one end of said strip, a bolt passing through the box-shaped member, a lever fulcrumed at one end about said bolt, an adjustable compression spring abutting said lever and the box-shaped arm, a lug on the cylindrical drum and a spring attached at one end to said lug and at the other end to the end of the lever within said drum so that the spring exerts a force on the lever in the same direction as that of compression spring, a rubber pad interposed between the lug on the drum and the end of the lever within the drum, and a lug on the lever at a point intermediate of said springs engaging with the turned up portion at the end of said strip so as to exert a force on the lever in counter-direction to that due to said springs.

6. A shock absorber for damping relative oscillation between two elements comprising a pair of arms pivoted together at their inner ends and adapted to be connected at their outer ends respectively to said elements, a cylindrical drum on one arm, a friction lining secured at a point removed from one end to the other arm engaging with said cylindrical drum, and means engaged with said end of the friction lining for increasing the pressure of said friction lining on said drum on relative angular movement of the arms in one direction only and for effecting a self-wrapping of said end of the friction lining upon the drum for further increasing said pressure simultaneously with commencement of reversal of such relative movement.

7. A shock absorber for damping relative oscillation between two elements comprising a pair of arms pivoted together at their inner ends respectively to said elements, a cylindrical drum on one arm, a friction lining secured at a point removed from one end to the other arm engaging with said cylindrical drum, constant pressure means associated with said friction lining, and means engaged with said end of the friction lining for increasing the pressure of said friction lining on said drum on relative angular movement of the arms in one direction only and for effecting a self-wrapping of said end of the friction lining upon the drum for further increasing said pressure simultaneously with commencement of reversal of such relative movement.

8. A shock absorber for damping relative oscillation between two elements comprising a pair of arms pivoted together at their inner ends and adapted to be connected at their outer ends respectively to said elements, a cylindrical drum on one arm, a friction lining secured at a point removed from one end to the other arm and engaging with said cylindrical drum, constant pressure means associated with said end of said friction lining means for adjusting said constant pressure means, and means engaged with said end of the friction lining for increasing the pressure of said friction lining on said drum on relative angular movement of the arms in one direction only and for effecting a self-wrapping of said end of the friction lining upon the drum for further increasing said pressure simultaneously with commencement of reversal of such relative movement.

9. A shock absorber for damping relative oscillation between two elements comprising a pair of arms pivoted together at their inner ends and adapted to be connected at their outer ends respectively to said elements, a cylindrical drum on one arm, a friction lining engaging said drum, restraining means at one end of said lining and associated with the other arm, a lever located partly within the drum and fulcrumed at its outer end to said other arm and attached to the free end of the friction lining and variable loading means governed by the angularity of said arms operating on the lever at its end within the drum.

10. A shock absorber for damping relative oscillation between two elements comprising a pair of arms pivoted together at their inner ends and adapted to be connected at their outer ends respectively to said elements, a cylindrical drum on one arm, a friction lining engaging said drum, restraining means at one end of said lining and associated with the other arm, a lever located partly within the drum and fulcrumed at its outer end to said other arm and attached to the free end of the friction lining, variable loading means governed by the angularity of said arms for operating on the lever at its end within the drum, and constant loading means for operating on said lever without the drum.

11. A shock absorber for damping relative oscillation between two elements comprising a pair of arms pivoted together at their inner ends and adapted to be connected at their outer ends respectively to said elements, a cylindrical drum on one arm, a friction lining secured at one end to the other arm and engaging said drum, a lever located partly within the drum and fulcrumed at its outer end to said other arm and attached to the free end of the friction lining, and variable loading means governed by the angularity of said arms for operating on the lever at its end within the drum.

12. A shock absorber for damping relative oscillation between two elements comprising a pair of arms pivoted together at their inner ends and adapted to be connected at their outer ends respectively to said elements, a cylindrical drum on one arm, a frictional lining engaging said drum, restraining means at one end of said lining and associated with the other arm, a lever located partly within the drum and fulcrumed at one end to said other arm and adapted to engage one end of said frictional lining, and variable loading means governed by the angularity of said arms operating on the lever at its end within the drum.

13. A shock absorber for damping relative oscillation between two elements comprising a pair of arms pivoted together at their ends and adapted to be connected at their outer ends respectively to said elements, a cylindrical drum on one arm, a friction lining secured at a point removed from one end to the other arm engaging with said cylindrical drum, a lever pivotally connected to the said end of the frictional lining and having resilient connections to both said arms so that said connections cause said lever to hold the lining engaged with the drum, whereby receding movement of said arms permits said lever to relieve the lining from the drum and approaching movement of the arms causes the lever to tighten the lining upon the drums, and whereby a return of the arms after an approaching movement is accompanied by a bodily movement of the free end of the lining in self-wrapping upon the drum and therewith a tightening of one of said resilient connections so that a further increase of the lining tension upon the drum is produced.

In witness whereof, I have hereunto signed my name this 20th day of August, 1928.

FULLERTON GEORGE GORDON ARMSTRONG.